United States Patent [19]

Camacho

[11] 4,306,532

[45] Dec. 22, 1981

[54] MODIFIED INTERNAL COMBUSTION ENGINE AND METHOD FOR UTILIZING LOW AND MEDIUM BTU GASEOUS FUELS

[75] Inventor: Salvador L. Camacho, Raleigh, N.C.

[73] Assignee: Technology Application Services Corporation, Raleigh, N.C.

[21] Appl. No.: 65,001

[22] Filed: Aug. 8, 1979

[51] Int. Cl.³ ............................................. F02M 13/08
[52] U.S. Cl. .................................... 123/527; 123/525; 123/DIG. 7
[58] Field of Search ............... 123/525, 527, 528, 529, 123/27 GE, DIG. 7, 1 R, 575

[56] References Cited

U.S. PATENT DOCUMENTS

| Re. 26,145 | 1/1967 | Friddell | 123/DIG. 7 |
| 2,277,130 | 3/1942 | Miller | 123/1 R |
| 2,664,872 | 1/1954 | Ericson | 123/529 |
| 2,972,988 | 2/1961 | Ranck | 123/527 |
| 3,646,924 | 3/1972 | Newkirk | 123/527 |
| 3,659,574 | 5/1972 | Reschke | 123/525 |
| 3,789,820 | 2/1974 | Douglas | 123/27 GE |
| 4,103,653 | 8/1978 | Ueno | 123/575 |

Primary Examiner—Ronald H. Lazarus
Attorney, Agent, or Firm—B. B. Olive

[57] ABSTRACT

A modified internal combustion engine of the carburetor type and method of modification enables low and medium BTU fuels in gaseous form to be utilized either as the sole fuel or in conjunction with other relatively high BTU fuels in liquid or gaseous form.

8 Claims, 3 Drawing Figures

MODIFIED INTERNAL COMBUSTION ENGINE AND METHOD FOR UTILIZING LOW AND MEDIUM BTU GASEOUS FUELS

BACKGROUND OF THE INVENTION

1. Field of the Invention

The invention relates to internal combustion engines and modifications thereof for utilizing fuels of relatively low BTU value.

2. Description of the Prior Art

Internal combustion engines include both fuel injection and carburetor types. Relatively high BTU content fuels in liquid form, e.g., gasoline and kerosene, as well as relatively high BTU content fuels in pressurized liquid or gaseous form, e.g., liquified petroleum (LP gas) and methane, have been employed to operate internal combustion engines of the carburetor type.

With the advent of the energy crisis, a need has arisen for internal combustion engines which can operate on relatively low BTU, i.e., 100 to 800 BTU's per cubic foot, fuels in gaseous form which can be made from corn, peanut hulls, celery tops or other materials which are known to be convertible to low BTU gaseous fuels.

The invention has as its object the provision of a modified internal combustion engine of the carburetor type capable of operating on a fuel of low to medium BTU content, i.e., 100 to 800 BTU's per cubic foot, in pressurized gaseous form or, if necessary, on other fuels of relatively high BTU content in either liquid or gaseous form.

SUMMARY OF THE INVENTION

An internal combustion engine of the carburetor type is modified according to the invention to operate on low to medium BTU fuels, in pressurized gaseous form. Modifications are made to the carburetor and timing and in providing means for admitting the pressurized gaseous fuel to the engine under controlled pressure conditions. Various embodiments allow the modified engine to selectively use relatively low or high BTU fuels in gaseous form as well as conventional fuels of relatively high BTU content such as gasoline.

DESCRIPTION OF THE PREFERRED EMBODIMENT

Figure 1:
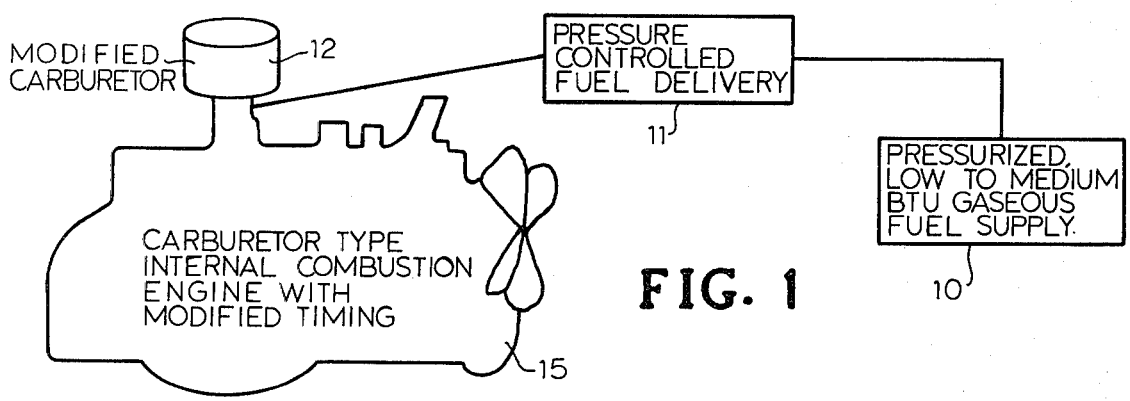
FIG. 1 is a schematic diagram of a poer system having a modified internal combustion engine of the carburetor type and pressurized gaseous fuel supply of low to medium BTU content according to the invention.

It is known that propane gas has a BTU content of 2900 BTU's per cubic foot, that methane has a BTU content of 1000 BTU's per cubic foot and that conventionally, such gaseous relatively high BTU content fuels are introduced to an internal combustion engine of the carburetor type at relatively low pressure, e.g., 5 p.s.i. It is also known that fuels in gaseous form of relatively low BTU content, e.g., 100 to 150 BTU's per cubic foot or medium BTU content, e.g., 300 to 800 BTU per cubic foot, can be made from material such as corn, peanut hulls, celery tops, acetate film and the like. However, so far as is known, internal combustion engines of the carburetor type have not previously been adapted to operate on fuels of relatively low to medium BTU content which for the purpose of the present description is assumed to mean pressurized gaseous fuels having a BTU content within the range of 100 to 800 BTU's per cubic foot. Among the practical problems that have to be overcome is the starting problem. For example, an internal combustion engine may be made to operate on a relatively low to medium BTU content gaseous fuel but is not capable of starting on such fuel of relatively low to medium BTU content. The present invention provides an internal combustion engine of the carburetor type which can both start and operate on low to medium BTU content fuels in pressurized gaseous form or can, for example, start on a pressurized gaseous or liquid high BTU content fuel and then switch over for operation to a low to medium content BTU fuel in gaseous form. The invention is thus concerned with both the nature of the fuel as well as the method of fuel delivery and in addition with modifications to the conventional internal combustion engine of the carburetor type to meet the stated objectives. The fuel supply 10 represents a pressurized low to medium BTU gaseous fuel supply with the BTU content being as previously defined. Fuel supply 10, for example, could represent a pressurized gaseous fuel made from corn having a BTU content of 310 BTU's per cubic foot and held under an initial pressure in a suitable container at 2000 p.s.i.

The gaseous fuel from fuel supply 10 is led through a suitable pressure controlled fuel delivery 11 which may be either under manual or automatic control and which delivers the gaseous fuel of low to medium BTU content at an appropriate relatively high, 50 p.s.i., pressure, and at least 25 p.s.i., to the modified carburetor 12 on a conventional carburetor-type internal combustion engine 15 with the timing modified so that firing takes place preferably at top dead center. Modified carburetor 12 represents a carburetor having a reduced air orifice and an increased fuel delivery opening.

As an actual example of a system made according to the invention, a 1970 model, four cylinder, four-cycle Jeep engine was modified in the following respects. The air orifice was reduced from 1.25 inches in diameter to 0.909 inches in diameter. The conventional carburetor had twelve holes for admission of fuel, normally propane, and which were originally of 5/32 inch diameter. The conventional timing vacuum advance on the distributor was removed and the timing was set so that sparking occurred at top dead center. A pressurized gaseous fuel in a container under an initial pressure of 160 p.s.i. and of 310 BTU content was made from corn and was fed to the modified engine 15 through the modified carburetor 12 with the fuel delivery pressure control maintaining the delivered pressure of the gaseous fuel at 50 p.s.i. The vehicle was run successfully for several miles and up to a speed of 40 miles per hour and with the 5/32" fuel orifices increased to 6/32" diameter.

While it is believed that the modified engine and conversion method and power system of the invention will find widespread application for vehicle operation, it is anticipated that the invention will also find application with stationary internal combustion engines of the carburetor type having available low to medium pressurized gaseous fuels for starting and operation purposes. Also, it is contemplated that portable engine-fuel systems will be made and become available utilizing the present invention.

Figure 2:
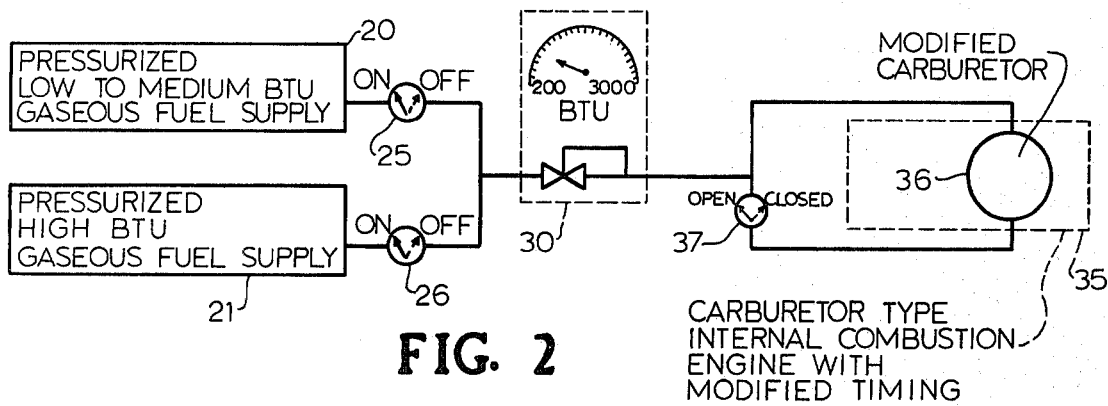
FIG. 2 is a schematic diagram showing a system made according to the invention and adapted to selectively employ either or both a low to medium BTU or high BTU content fuel in gaseous pressurized form.

The system of FIG. 2 provides for use of either a pressurized low to medium BTU gaseous fuel supply 20 or a pressurized high BTU gaseous fuel supply 21. Control valves 25, 26 feed the selected pressurized gaseous fuel to an adjustable pressure regulator 30 which, for example, may provide a dial indication according to BTU content, e.g., over a range of 200 to 300 BTU's. From pressure regulator 30, the pressurized gaseous fuel at the selected pressure is fed to the modified engine 35 and modified carburetor 36 which may be modified as previously explained. Since there is a wide variation in types of internal combustion engines of the carburetor type, it is, of course, anticipated that the exact changes required for reducing the air orifice size and increasing the fuel orifice size as well as the exact modifications for changing the timing may vary somewhat from the specific example previously given. Another valve 37 may be opened or closed to reduce or increase the amount of pressurized gaseous fuel entering the modified carburetor 36. When operating on the low to medium BTU gaseous fuel from fuel supply 20, valve 37 would normally be open so as to admit an increased BTU content to modified engine 35. Alternatively, when operating on the high BTU gaseous fuel from supply 21, valve 37 would normally be closed and modified carburetor 36 would operate with less volume of gaseous fuel being admitted to the engine 35. Reduced fuel admission pressure is used for supply 21.

Figure 3:
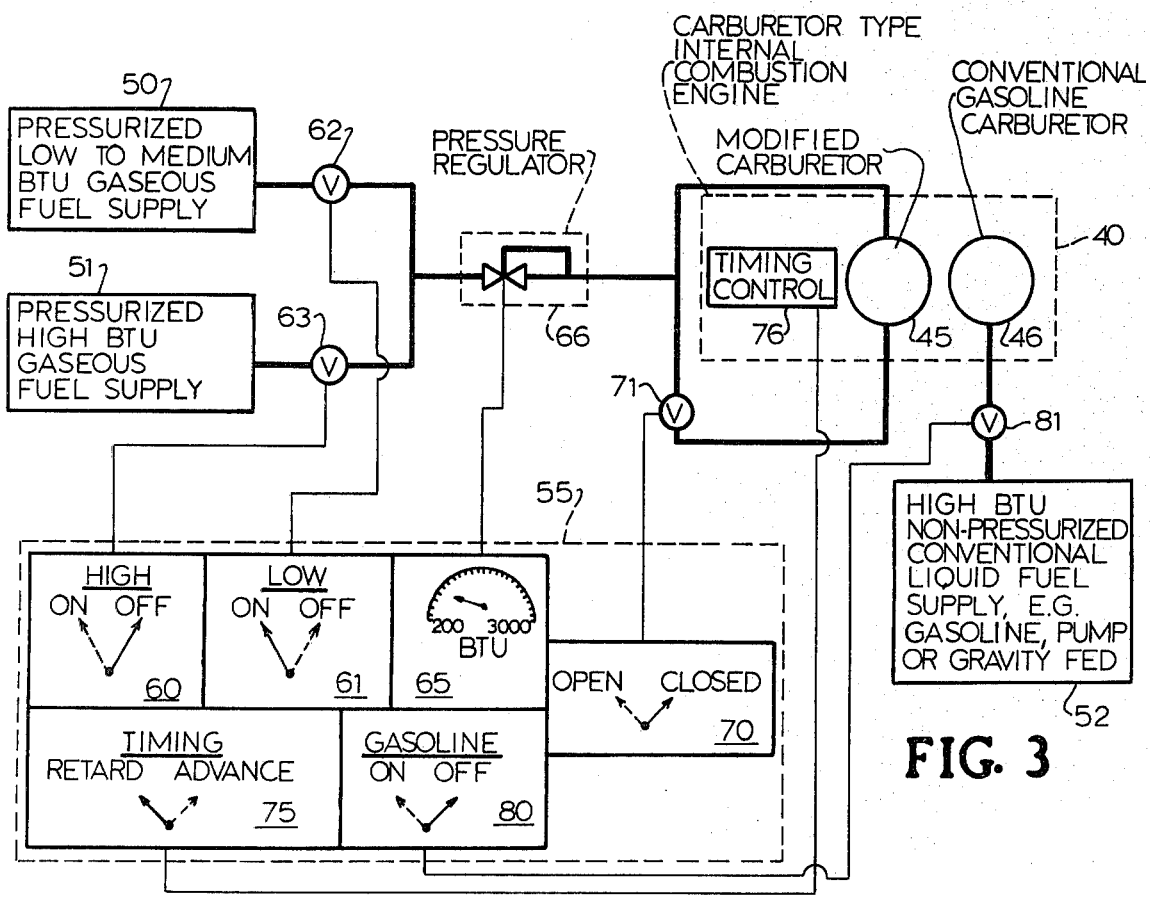
FIG. 3 is a schematic diagram of a system made according to the invention which incorporates the system of FIG. 2 and in addition makes provision for selective use of a high BTU content fuel in non-pressurized liquid form.

The system of FIG. 3 incorporates the system of FIG. 2 and in addition provides for alternative use of a conventional liquid fuel such as gasoline. The carburetor-type internal combustion engine 40 is provided with a pair of dual carburetors comprising a modified carburetor 45 and a conventional carburetor 46. Modified carburetor 45 may be modified as previously explained and the conventional carburetor 46 may partake of any known conventional form appropriate to the nature of the carburetor-type internal combustion engine 40 being employed. Since use of dual carburetors is a well-known practice those skilled in the art will readily understand the adaptation of modified carburetor 45 and conventional carburetor 46 to engine 40 so that engine 40 may operate using either carburetor.

Three sources of fuel are provided for the system of FIG. 3. Such fuel sources include a pressurized low to medium BTU gaseous fuel supply 50, a pressurized high BTU gaseous fuel supply 51 and a high BTU non-pressurized conventional fuel supply 52 which can be pump or gravity fed. A control panel 55 includes suitable manual or remote controls 60, 61 for controlling valves 62 and 63. Additionally, a BTU scaled control 65 controls the setting of pressure regulator 66 which control may also be either manual, electrical or electronic in nature according to known valve control practices. Another valve control 70 controls valve 71 which compares to the previously explained valve 37 of the system of FIG. 2. Engine 40 is provided with a suitable timing adjustment means 75 connected to an appropriate timing control 76 on engine 40 enabling the timing to be either retarded or advanced according to the nature of the fuel being admitted to engine 40. Another valve control 80 controls valve 81 so as to allow fuel from the conventional fuel supply 52 to be either open or closed according to the mode of engine operation. Since automatic as well as manual timing controls are well-known in the internal combustion engine art, those skilled in the art will readily understand how engine 40 be quickly adjusted for either retarded or advanced timing of the engine 40 to meet the needs of the particular fuel being employed.

In operation, the system of FIG. 3 will, of course, be operated according to the desired mode of operation. For example, with valve 63 and valve 81 closed, with BTU regulator 65 set to an appropriate low to medium BTU setting and with valve 71 open, the engine 40 would be adapted to operate on a low to medium BTU content pressurized gaseous fuel from fuel supply 50 by utilizing the modified carburetor 45. In another mode, valve 62 and valve 81 could be closed, valve 63 open, valve 71 closed and the BTU control 65 set to a relatively high BTU setting under which conditions, engine 40 could be operated through modified carburetor 45 using a high BTU content pressurized gaseous fuel from supply 51. One aspect of the invention that should be recognized here is that a modified carburetor according to the invention can be made to operate on either a pressurized low to medium BTU gaseous fuel or a pressurized high BTU gaseous fuel with an appropriate pressure setting of BTU scaled pressure control 65 and by closing of valve 71. In another mode, valves 62 and 63 can be closed, valve 81 opened and the timing adjustment 75 set to advance the spark produced by timing control 76 and in this mode, engine 40 using the conventional gasoline carburetor 46 would be adapted to operate with a conventional fuel, e.g., gasoline from the pump or gravity fed supply 52. With regard to timing, note should be made that the conventional carburetor type internal combustion engine employs ignition timing which causes the spark to fire prior to full compression of the gasoline and air mixture.

What is claimed is:

1. The method of converting a conventional carburetor-type internal combustion engine normally operated on a gravity or pump fed non-pressurized liquid gasoline supply so as to adapt the engine for operation on a pressurized supply of gaseous fuel of BTU content within the range of 100 to 800 BTU's per cubic foot, comprising the steps of:
   (a) reducing the air orifice size of the carburetor to a size appropriate to said BTU content;
   (b) increasing the fuel admission orifice size of said carburetor to a size appropriate to said BTU content;
   (c) retarding the timing of said engine to a retarded timing appropriate to said BTU content;
   (d) installing means for controlling the pressure at which said gaseous fuel is admitted through the said enlarged fuel orifices to said engine; and
   (e) connecting a supply of said pressurized gaseous fuel to said modified carburetor through said pressure control means.

2. The method of claim 1 including a further conversion adapting said engine to operate on either a supply of said pressurized gaseous fuel of BTU content within the range of 100 to 800 BTU's per cubic foot or a pressurized gaseous fuel of BTU content substantially in excess of said 800 BTU's per cubic foot, comprising the additional steps of:
   (a) connecting a second supply of pressurized gaseous fuel of BTU content substantially in excess of 800 BTU's per cubic foot to said modified carburetor through means enabling selective connection of said first or second supply to said modified carburetor; and (b) installing means enabling the volume and pressure of fuel supplied to said modified carburetor to be reduced when supplied from said second supply.

3. A power system, comprising:

(a) a pressurized supply of gaseous fuel of BTU content within the range of 100 to 800 BTU's per cubic foot;

(b) an internal combustion engine of the type normally operated from and normally timed for operating from a non-pressurized liquid gasoline supply and including:

(i) a carburetor of the type normally operated from a non-pressurized liquid gasoline supply and having the size of the air orifices thereof reduced and the size of the fuel admission orifice thereof increased to sizes appropriate to said BTU content; and (ii) timing means for timing said engine and having a retarded timing appropriate to said BTU content; and (c) means for connecting said supply to said carburetor and controlling the pressure at which said fuel is admitted to said carburetor through said increased size fuel orifice.

4. A power system as claimed in claim 3, wherein:

(a) said retarded timing is set for firing said engine at top dead center; and (b) said means for controlling said pressure maintains the pressure at which said fuel is admitted to said carburetor to at least 25 p.s.i.

5. A power system as claimed in claim 3, including:

(a) a second container of pressurized gaseous fuel of BTU content substantially in excess of 800 BTU's per cubic foot; and (b) means to selectively admit fuel from either said first or second container to said modified carburetor to operate said engine.

6. A power system as claimed in claim 5, including:

(a) means to admit said fuel from said second container to said engine at a reduced volume as compared to the volume at which fuel from said first container is admitted to said engine.

7. A power system as claimed in claim 3, including:

(a) a second container of fuel in a liquid, non-pressurized state and of BTU content substantially in excess of 800 BTU's per cubic foot;

(b) a conventional carburetor on said engine connectable to said second container and arranged for selective dual operation with said modified carburetor;

(c) means to selectively adjust timing of said engine appropriate to the BTU content of the fuel on which the engine is operating; and (d) means for controlling the source of fuel supply admitted to said engine from said containers thereby enabling said engine to be operated from either pressurized gaseous fuel of low to medium BTU content within the range of 100 to 800 BTU's per cubic foot or from conventional fuel in a liquid, non-pressurized state of a BTU content substantially in excess of 800 BTU's per cubic foot.

8. A power system as claimed in claim 3, including:

(a) a second container of pressurized gaseous fuel of BTU content substantially in excess of 800 BTU's per cubic foot;

(b) a third container of fuel in a liquid, non-pressurized state and of BTU content substantially in excess of 800 BTU's per cubic foot;

(c) a conventional carburetor on said engine connectable to said third container and arranged for selective dual operation with said modified carburetor;

(d) means to selectively adjust timing of said engine appropriate to the BTU content of the fuel on which the engine is operating; and (e) means for controlling the source of fuel supply admitted to said engine from said first, second, and third containers thereby enabling said engine to be operated from either a supply of pressurized gaseous fuel of low to medium BTU content within the range of 100 to 800 BTU's per cubic foot, a pressurized gaseous fuel of BTU content substantially in excess of 100 to 800 BTU's per cubic foot or from a fuel in a liquid, non-pressurized state of a BTU content substantially in excess of 800 BTU's per cubic foot

* * * * *

UNITED STATES PATENT AND TRADEMARK OFFICE
CERTIFICATE OF CORRECTION

PATENT NO. : 4,306,532
DATED : December 22, 1981
INVENTOR(S) : Salvador L. Camacho It is certified that error appears in the above—identified patent and that said Letters Patent is hereby corrected as shown below:

Col. 1, line 46, "poer" should be --power--.

Col. 4, line 4, Insert --may-- after "40".

Signed and Sealed this

Ninth Day of March 1982

[SEAL]

Attest:

GERALD J. MOSSINGHOFF

Attesting Officer     Commissioner of Patents and Trademarks